(12) United States Patent
Lee (10) Patent No.: US 10,636,309 B2
(45) Date of Patent: Apr. 28, 2020

(54) VEHICLE COMMUNICATION MANAGEMENT SYSTEMS AND METHODS

(71) Applicant: Ford Global Technologies, LLC, Dearborn, MI (US)

(72) Inventor: Yun Ho Lee, Pleasanton, CA (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/699,805

(22) Filed: Sep. 8, 2017

(65) Prior Publication Data

US 2019/0080614 A1 Mar. 14, 2019

(51) Int. Cl.
| | |
|---|---|
| *G08G 1/00* | (2006.01) |
| *G08G 1/0967* | (2006.01) |
| *G08B 25/01* | (2006.01) |
| *G08B 25/08* | (2006.01) |

(52) U.S. Cl.
CPC .......... *G08G 1/205* (2013.01); *G08B 25/016* (2013.01); *G08B 25/08* (2013.01); *G08G 1/096791* (2013.01); *G08G 1/20* (2013.01); *G01S 2205/006* (2013.01)

(58) Field of Classification Search
CPC .... G08G 1/205; G08G 1/096791; G08G 1/20; G08B 25/016; G01S 2205/006
See application file for complete search history.

(56) References Cited

U.S. PATENT DOCUMENTS

| | | | |
|---|---|---|---|
| 6,580,981 B1 | 6/2003 | Masood | |
| 8,538,372 B2 | 9/2013 | Yuasa | |
| 8,749,350 B2 | 6/2014 | Geisler | |
| 8,798,617 B1* | 8/2014 | Cole | H04W 8/005 |
| | | | 455/404.2 |
| 9,288,652 B2 | 3/2016 | Yuasa | |
| 9,305,461 B2 | 4/2016 | Elzein | |
| 9,472,104 B2 | 10/2016 | Hyde | |
| 10,176,524 B1* | 1/2019 | Brandmaier | G06Q 40/08 |
| 10,460,534 B1* | 10/2019 | Brandmaier | G08G 1/162 |
| 2003/0125854 A1* | 7/2003 | Kawasaki | G07C 5/008 |
| | | | 701/431 |
| 2010/0179720 A1* | 7/2010 | Lin | G07C 5/008 |
| | | | 701/31.4 |
| 2016/0055685 A1 | 2/2016 | Lilly | |
| 2016/0277911 A1 | 9/2016 | Kang | |

(Continued)

OTHER PUBLICATIONS

Vehicle networking data-upload strategy based on mobile cloud services.

*Primary Examiner* — Mehmood B. Khan
(74) *Attorney, Agent, or Firm* — David R. Stevens; Stevens Law Group (57) ABSTRACT

Example vehicle communication management systems and methods are described. In one implementation, a communication management system determines whether a vehicle can communicate with an external system. If the vehicle is unable to communicate with the external system, the communication management system identifies a neighboring device that can communicate with the external system and communicates vehicle information to the neighboring device. The communication management system also requests the neighboring device to communicate the information, and other details from the neighboring device's perspective, to the external system.

17 Claims, 6 Drawing Sheets

(56) References Cited

U.S. PATENT DOCUMENTS

| | | | |
|---|---|---|---|
| 2016/0357188 A1* | 12/2016 | Ansari | G05D 1/0212 |
| 2017/0076331 A1* | 3/2017 | Lei | G06Q 30/0267 |
| 2017/0086234 A1* | 3/2017 | Li | H04W 8/005 |
| 2018/0061232 A1* | 3/2018 | Madigan | G08G 1/096783 |
| 2018/0088574 A1* | 3/2018 | Latotzki | G05D 1/0061 |
| 2018/0295655 A1* | 10/2018 | Cavalcanti | H04W 12/0023 |
| 2019/0045336 A1* | 2/2019 | Chang | H04W 4/40 |
| 2019/0143967 A1* | 5/2019 | Kutila | G08G 1/162 |
| 2019/0364402 A1* | 11/2019 | Lee | H04W 4/90 |

* cited by examiner

VEHICLE COMMUNICATION MANAGEMENT SYSTEMS AND METHODS

TECHNICAL FIELD

The present disclosure relates to vehicular systems and, more particularly, to systems and methods that manage communication with other devices, systems, or vehicles.

BACKGROUND

Automobiles and other vehicles provide a significant portion of transportation for commercial, government, and private entities. Vehicles, such as autonomous vehicles, drive on roadways, parking lots, and other areas when transporting passengers or objects from one location to another. In some situations, such as an accident or a driver's medical issue, a vehicle may need to communicate with an external system or an emergency service provider. However, it the vehicle was in an accident, the vehicle systems that communicate with an external system or emergency service provider may not be operating correctly. In this situation, the vehicle needs to find an alternate approach to communicate with the external system or emergency service provider.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

Figure 1:
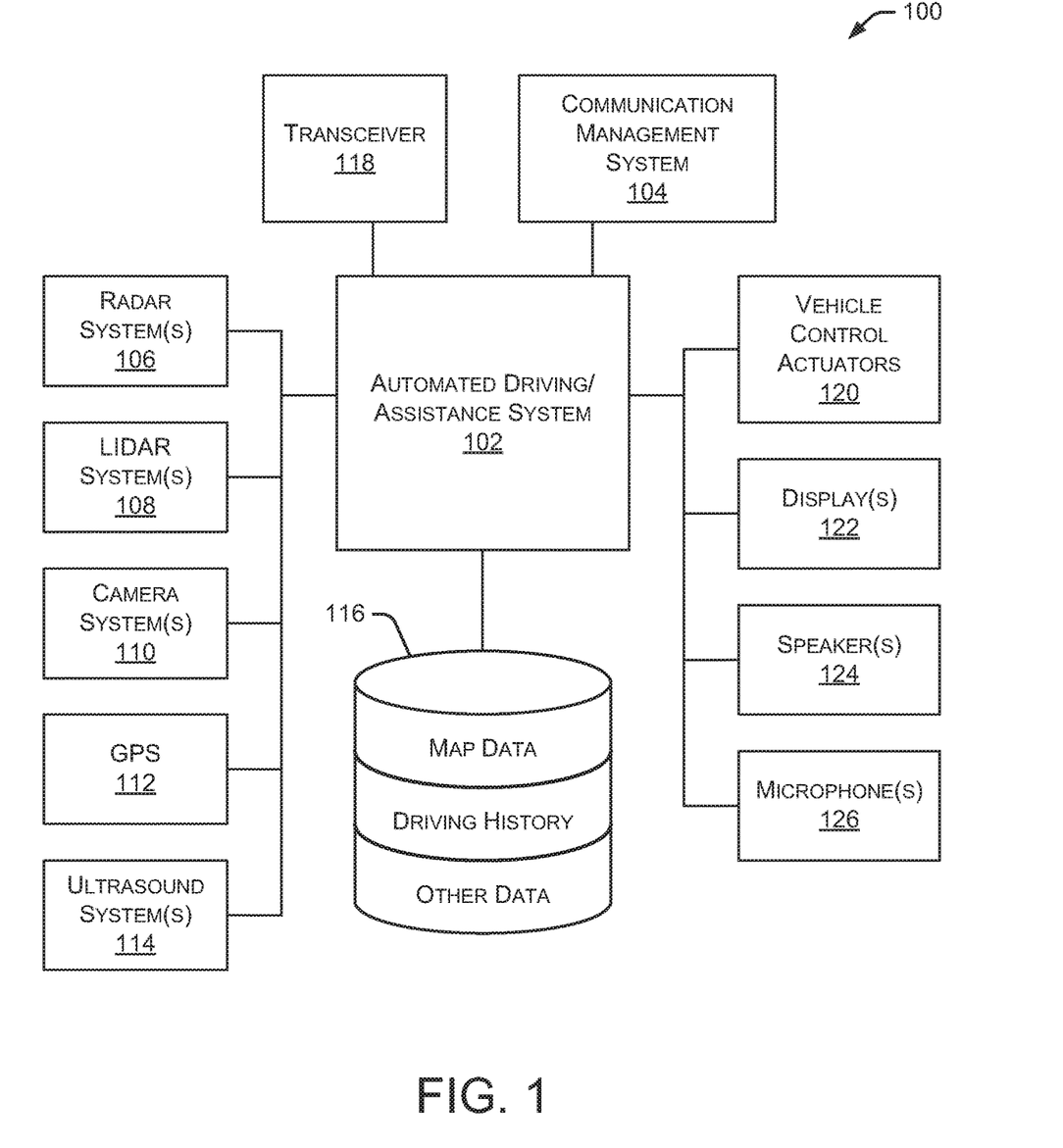
FIG. 1 is a block diagram illustrating an embodiment of a vehicle control system that includes a communication management system.

FIG. 1 is a block diagram illustrating an embodiment of a vehicle control system 100 within a vehicle that includes a communication management system 104. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, vehicle locks, or any other auxiliary systems of the vehicle. In another example, the automated driving/assistance system 102 may not be able to provide any control of the driving (e.g., steering, acceleration, or braking), but may provide notifications and alerts to assist a human driver in driving safely. Vehicle control system 100 includes communication management system 104 that interacts with various components in the vehicle to control and manage communications between the parent vehicle (i.e., the vehicle that contains communication management system 104) and other systems, devices, or vehicles. Although communication management system 104 is shown as a separate component in FIG. 1, in alternate embodiments, communication management system 104 may be incorporated into automated driving/assistance system 102 or any other vehicle component.

Vehicle control system 100 also includes one or more sensor systems/devices for detecting a presence of nearby objects (or obstacles) or determining a location of a parent vehicle (e.g., a vehicle that includes vehicle control system 100). In some embodiments, the one or more sensor systems/devices are useful in determining a state or situation of the vehicle, such as operating normally, accident detected, driver emergency, and the like. In the example of FIG. 1, vehicle control system 100 may include one or more Radar (Radio detection and ranging) systems 106, one or more Lidar (Light detection and ranging) systems 108, one or more camera systems 110, a global positioning system (GPS) 112, and/or ultrasound systems 114. The one or more camera systems 110 may include a rear-facing camera mounted to the vehicle (e.g., a rear portion of the vehicle), a front-facing camera, and one or more side-facing cameras. Camera systems 110 may also include one or more interior cameras that capture images of the vehicle's interior, such as passengers and other objects inside the vehicle. Lidar systems 108 may include one or more interior Lidar sensors that capture data associated with the area inside the vehicle. Vehicle control system 100 may include a data store 116 for storing relevant or useful data for navigation and safety, such as map data, driving history, history of vehicle driving path, history of vehicle speed change, history of vehicle movement directions, history of vehicle acceleration, or other data. Vehicle control system 100 may also include a transceiver 118 for wireless communication with a mobile or wireless network, other vehicles, infrastructure, or any other communication system.

Vehicle control system 100 may include vehicle control actuators 120 to control various aspects of the driving of the vehicle such as electric motors, switches or other actuators, to control braking, acceleration, steering, seat belt tension, door locks, or the like. Vehicle control system 100 may also include one or more displays 122, speakers 124, microphones 126, or other devices so that notifications to a human driver or passenger may be provided. A display 122 may include a heads-up display, dashboard display or indicator, a display screen, or any other visual indicator, which may be seen by a driver or passenger of a vehicle. Speakers 124 may include one or more speakers of a sound system of a vehicle or may include a speaker dedicated to driver or passenger notification. Microphones 126 may include any type of microphone located inside or outside the vehicle to capture sounds originating from inside or outside the vehicle.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, automated driving/assistance system 102 is configured to control driving or navigation of a parent vehicle. For example, automated driving/assistance system 102 may control the vehicle control actuators 120 to drive a path on a road, parking lot, driveway or other location. In some embodiments, automated driving/assistance system 102 may determine a path based on information or perception data provided by any of the components 106-118. A path may also be determined based on a route that maneuvers the vehicle to avoid or mitigate a potential collision with another vehicle or object. The sensor systems/devices 106-110 and 114 may be used to obtain real-time sensor data so that automated driving/assistance system 102 can assist a driver or drive a vehicle in real-time.

Figure 2:
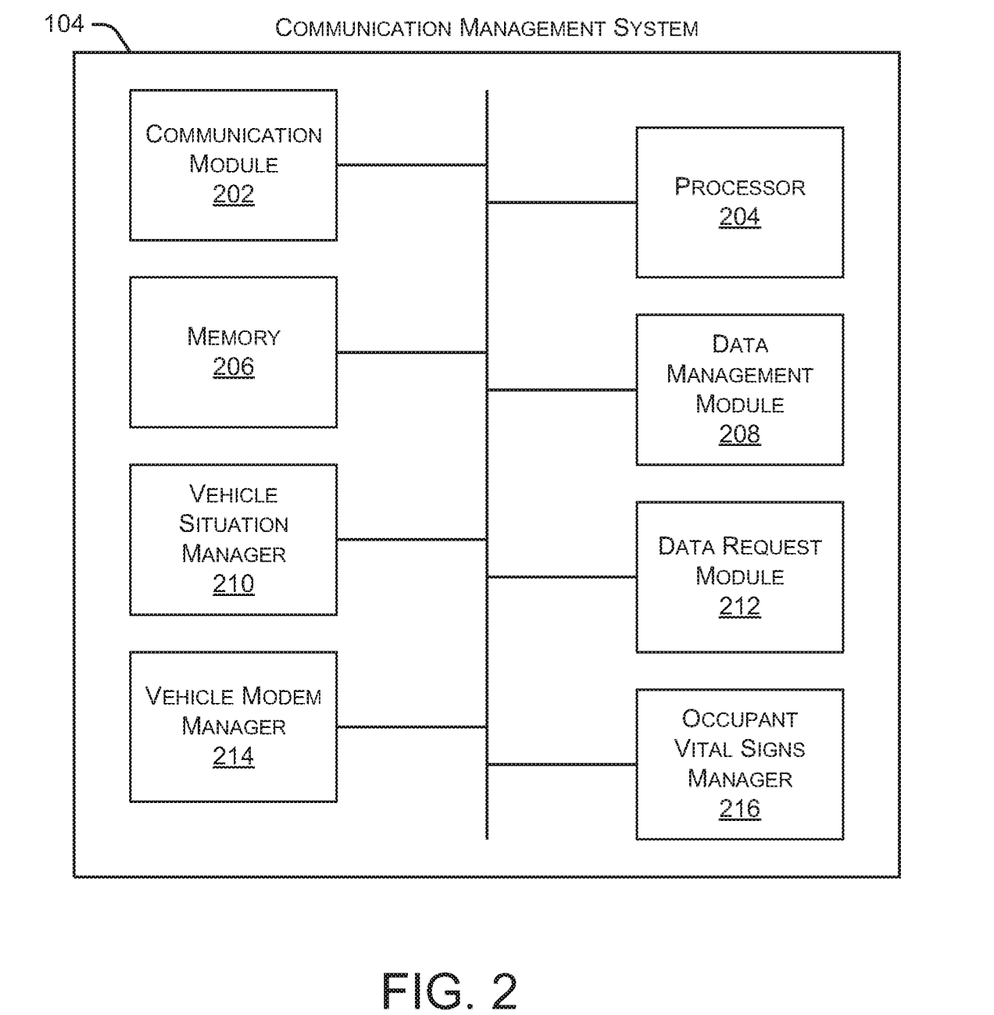
FIG. 2 is a block diagram illustrating an embodiment of a communication management system.

FIG. 2 is a block diagram illustrating an embodiment of communication management system 104. As described herein, "communication management system" 104 may also be referred to as a "vehicle communication management system." As shown in FIG. 2, communication management system 104 includes a communication module 202, a processor 204, and a memory 206. Communication module 202 allows communication management system 104 to communicate with other systems, such as automated driving/assistance system 102, and communicate with other users and systems external to the vehicle. In some embodiments, communication module 202 is capable of determining which nearby devices or systems have an active (e.g., valid) connection with the vehicle in which communication management system 104 is located. For example, communication module 202 may determine which nearby vehicles, mobile devices, infrastructure devices, and the like are communicating with (or are available to communicate with the vehicle). As discussed herein, this information is useful when a situation occurs that requires the vehicle to communicate with other devices, systems, vehicles, and the like.

Processor 204 executes various instructions to implement the functionality provided by communication management system 104, as discussed herein. Memory 206 stores these instructions as well as other data used by processor 204 and other modules and components contained in communication management system 104.

Additionally, communication management system 104 includes a data management module 208 that collects and manages data from various vehicle sensors, systems, and components. The data includes, for example, the operating state of the vehicle, the status of the vehicle driver and passengers, and the like. The data may include detection of an accident or other emergency, including a problem with one or more vehicle systems, a medical emergency experienced by the driver or passenger, or other dangerous (or potentially dangerous) situation. In some embodiments, the data may be received from other devices, components, systems, or vehicles external to the parent vehicle. For example, data management module 208 may receive data from a nearby vehicle that provides image data or other information associated with the parent vehicle. In the case of an accident, the nearby vehicle may provide image data showing the current position and location of the parent vehicle as well as the extent of damage to the parent vehicle.

A vehicle situation manager 210 determines the parent vehicle's current situation or operating status. As discussed herein, the situation or operating status may identify an accident, medical emergency related to the driver or a passenger, or other situation that requires the assistance of an emergency service provider, accident response service, vehicle repair service, and the like. As discussed herein vehicle situation manager 210 determines the situation or operating status of the vehicle based on data from vehicle sensors as well as data from other vehicles, systems, and devices.

Communication management system 104 also includes a data request module 212 that may request data from other vehicles, systems, and devices. Additionally, data request module 212 may communicate requests for data or requests to transmit information to other vehicles, systems, and devices. For example, if the parent vehicle is damaged in an accident and cannot communicate with an emergency service provider, the parent vehicle may still be able to communicate with nearby vehicles, systems, and devices. In this situation, the parent vehicle can request that a nearby vehicle, system, or device communicate data associated with the accident to an emergency service provider.

A vehicle modem manager 214 controls the operation of a communication modem within the parent vehicle. In some embodiments, vehicle modem manager 214 also controls the operation of any other communication mechanism or communication system within the vehicle.

Communication management system 104 also includes an occupant vital signs manager 216 that monitors one or more vital signs of a driver and/or a passenger, as discussed herein. In some embodiments, occupant vital signs manager 216 monitors vital signs such as heart rate, respiration rate, and the like. For example, heart rate sensors in a seat, seatbelt, or steering wheel can detect heart rate alone or in combination with image data from one or more cameras. Additionally, the image data may be used to analyze the occupant's breathing and level of awareness. Also, occupant vital signs manager 216 may monitor an occupant's stress level, emotional status, and the like. For example, the occupant's stress level, emotional status, and so forth can be estimated based on heart rate, breathing, level of awareness, oxygen (e.g., SpO2) level, and the like.

Figure 3:
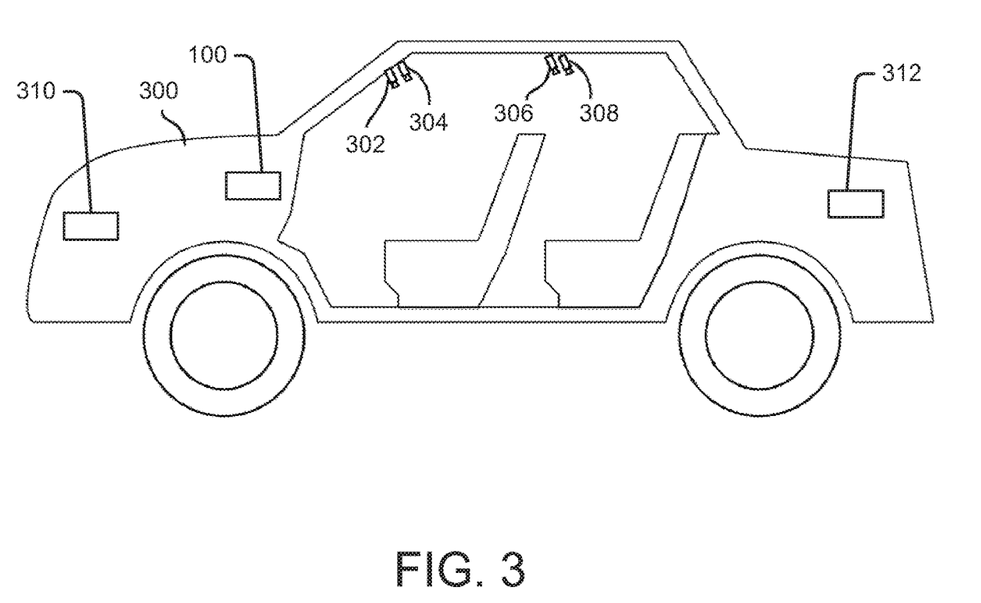
FIG. 3 illustrates an embodiment of a vehicle with multiple cameras and other sensors to monitor the interior and exterior of the vehicle.

FIG. 3 illustrates an embodiment of a vehicle 300 with multiple cameras and other sensors to monitor the interior and exterior of the vehicle. In some embodiments, vehicle 300 may operate as an autonomous vehicle and perform at least a portion of the functions and operations discussed herein. Vehicle 300 contains vehicle control system 100 as discussed herein. As shown in FIG. 3, vehicle 300 has two interior cameras 302 and 306 as well as two interior sensors 304, 308. In some embodiments, cameras 302, 306 are positioned and oriented in vehicle 300 such that a driver seating location and passenger seating locations are in the field of view of at least one camera 302, 306. Other areas of the interior of vehicle 300 may also be in the field of view of one or more cameras 302, 306. Sensors 304, 308 represent any type of sensor associated with, for example, radar systems 106, Lidar systems 108, ultrasound systems 114, and the like. In some embodiments, data captured by sensors 304, 308 is used in combination with data captured by cameras 302, 306 to identify a vehicle's current situation as well as the medical condition of vehicle occupants, including the driver and/or passengers. Although two interior cameras 302, 306 are shown in FIG. 3, in alternate embodiments, vehicle 300 may have any number of interior cameras positioned in various locations throughout the vehicle and aimed at different angles. Similarly, although two interior sensors 304, 308 are shown in FIG. 3, in alternate embodiments, vehicle 300 may have any number of interior sensors positioned in various locations throughout the vehicle.

Vehicle 300 also includes multiple exterior cameras 310 and 312 which are positioned and oriented such that areas outside the vehicle are in the field of view of at least one camera 310, 312. Although not shown in FIG. 3, in some embodiments, vehicle 300 also includes one or more exterior sensors, such as sensors associated with radar systems 106, Lidar systems 108, ultrasound systems 114, and the like. The exterior cameras and sensors capture image data and other data regarding the areas external to vehicle 300. This image data and other data is useful in determining nearby devices, systems, or vehicles, and useful in determining a current situation of vehicle 300. Although cameras and sensors 302-312 are shown in particular locations of vehicle 300, alternate embodiments may position any number of cameras and sensors 302-312 in any locations of vehicle 300.

Figure 4:
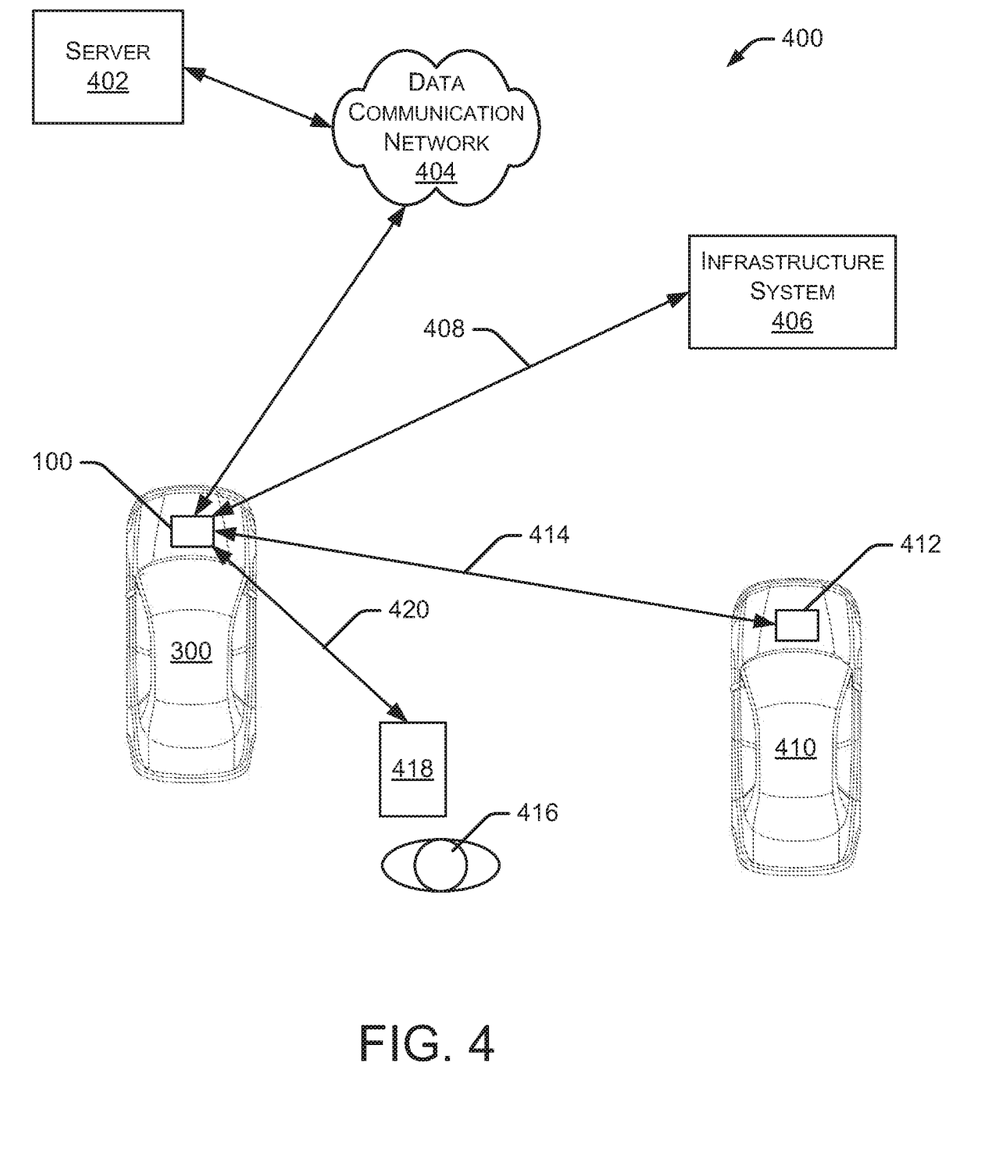
FIG. 4 is a block diagram illustrating an embodiment of a situation in which a vehicle communicates with one or more devices, systems, or vehicles.

FIG. 4 is a block diagram illustrating an embodiment of a situation 400 in which a vehicle communicates with one or more devices, systems, or vehicles. These devices, systems, or vehicles may be referred to herein as "neighboring devices" and include any type of system, device, or component capable of communicating with the vehicle. The example of FIG. 4 shows vehicle 300 at a particular location. Vehicle 300 contains vehicle control system 100 (which includes communication management system 104), as discussed herein. In some embodiments, vehicle 300 communicates with a server 402 via a data communication network 404. Server 402 may be any type of computing system, such as a cloud-based server, that communicates with vehicle 300 by receiving data from vehicle 300 and providing data to vehicle 300. For example, vehicle 300 may communicate GPS data, vehicle operating data, and the like to server 402. Additionally, server 402 may communicate map data, traffic data, maintenance reminders, and the like to vehicle 300. In some embodiments, vehicle 300 communicates with server 402 using a modem or other communication device in vehicle 300. For example, the modem may include a 4G modem, a 4G LTE modem, a 5G modem, or a WiFi® modem. In particular implementations, the data communicated between vehicle 300 and server 402 includes driving history, sensor data, driver vital signs, passenger vital signs, and the like.

In some embodiments, data communication network 404 includes a cellular communication network, the Internet, or any combination of two or more communication networks. Vehicle 300 may also communicate with one or more infrastructure systems 406, such as traffic signals, traffic monitoring systems, roadside units, and the like. For example, vehicle control system 100 may communicate with a particular vehicle infrastructure system 406 via a communication link 408 that includes a V2I (Vehicle-to-Infrastructure) communication protocol.

In some embodiments, vehicle 300 can communicate with other vehicles 410 that include some type of communication system 412 capable of communicating with vehicle control system 100 in vehicle 300. For example, vehicle 300 may communicate with another vehicle 410 via a communication link 414 that includes a V2V (Vehicle-to-Vehicle) communication protocol.

In the example of FIG. 4, a user 416 is located near vehicle 300 (or inside vehicle 300) and is operating a mobile device 418, such as a smartphone, tablet computer, or other computing system. Mobile device 418 communicates with vehicle control system 100, for example, via a data communication link 420. Data communication link 420 includes any type of communication link using any communication protocol, such as Bluetooth®, WiFi®, DSRC (Dedicated Short-Range Communications), LTE-based V2X (Vehicle-to-Everything), and the like. Although particular example devices, systems, and vehicles are shown in FIG. 4, in alternate situations, vehicle 300 may be capable of communicating with any number of different devices, systems, or vehicles.

As discussed in greater detail herein, in some situations, vehicle 300 may be involved in an accident that damages one or more vehicle components and prevents vehicle 300 from communicating with server 402. However, vehicle 300 may still be able to communicate with infrastructure system 406, another vehicle 410, or mobile device 418. In this situation, vehicle 300 can communicate indirectly with server 402 by sending data, and/or a request to contact server 402, to infrastructure system 406, another vehicle 410, or mobile device 418, which forward the data to server 402.

Figure 5:
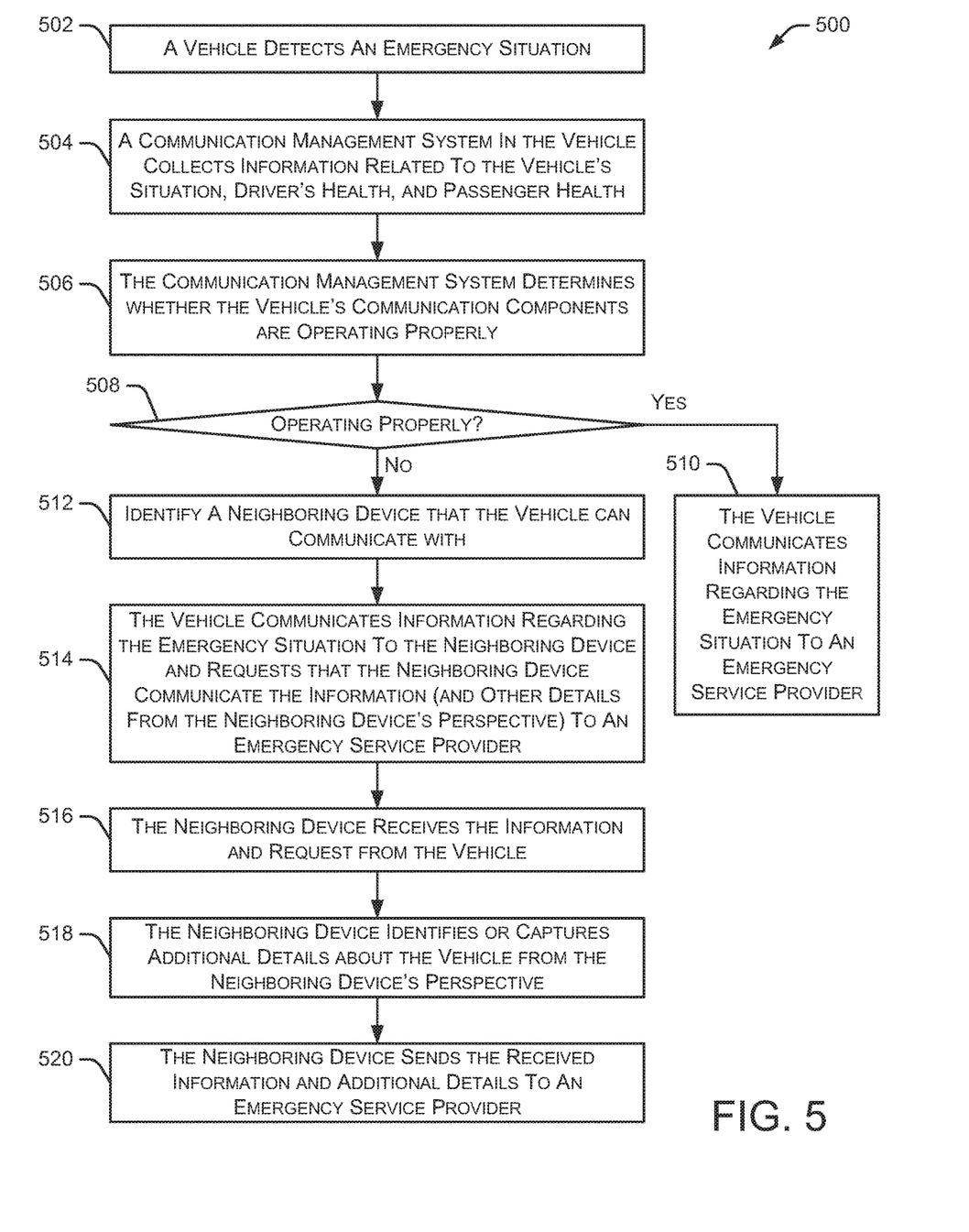
FIG. 5 is a flow diagram illustrating an embodiment of a method for requesting another vehicle or system to communicate details regarding an emergency situation.

FIG. 5 is a flow diagram illustrating an embodiment of a method 500 for requesting another vehicle or system to communicate details regarding an emergency situation. Initially, a vehicle detects 502 an emergency situation, such as an accident or a medical emergency associated with a vehicle occupant. A vehicle accident may be detected 502 using one or more vehicle sensors, such as an accelerometer sensor that detects a sudden deceleration or acceleration, a gyroscope sensor that detects a vehicle rollover or other unusual position of the vehicle. In some embodiments, a vehicle accident may be detected by images captured by a camera inside or outside the vehicle. Additionally, a vehicle accident (or other situation) may be detected by an impact sensor, a pressure sensor, a component/system malfunction, occupant vital signs, and the like. In particular scenarios, an emergency situation may not include an accident. For example, a stalled vehicle on a busy highway or a medical issue associated with a vehicle occupant may represent an emergency situation that requires the attention of an emergency service provider or similar service.

After detecting 502 an emergency situation, a communication management system in the vehicle collects 504 information related to the vehicle's situation, driver's health, and passenger health. The communication management system also determines 506 whether the vehicle's communication components and systems are operating properly. For example, the vehicle may need to communicate with a server (e.g., server 402 in FIG. 4) or other system to send information about the emergency situation, such as the occurrence of an accident or a medical issue associated with the driver or a passenger. If the vehicle's communication components and systems are operating properly at 508, the vehicle communicates 510 the information regarding the emergency situation to a server, an emergency service provider, an accident response service, or other system. In some embodiments, method 500 ends after completing step 510. In other embodiments, method 500 continues to step 512 after completing step 510.

If the vehicle's communication components and systems are not operating properly at 508, the communication management system identifies 512 a neighboring device that the vehicle can communicate with. For example, the neighboring device may be a system, device, component, vehicle, or infrastructure system located external to the vehicle but close enough to communicate with the vehicle. In particular situations, the neighboring device may be located inside the vehicle, such as a mobile device operated by an occupant of the vehicle.

In some embodiments, an accident or vehicle component failure may prevent the vehicle from communicating with a server, an emergency service provider, accident response service, or other system. For example, an accident (such as a rollover accident) may damage an external vehicle antenna that allows the vehicle to communicate with a server, an emergency service provider, or an accident response service via a cellular communication network or the Internet. Although the external vehicle antenna is broken, the vehicle may still be able to communicate with nearby devices, systems, or vehicles (i.e., neighboring devices) using a different communication mechanism, such as the communication links and systems discussed herein with respect to FIG. 4. For example, the vehicle may have a secondary antenna for short-range communications, such as Bluetooth® and WiFi®. If the vehicle identifies multiple neighboring devices, it may broadcast a request to all of the neighboring devices. In some situations, the vehicle may communicate with multiple neighboring devices simultaneously to get multiple different perspectives related to the vehicle's current situation.

After identifying 512 a neighboring device, the vehicle communicates 514 information regarding the emergency situation to the neighboring device and requests that the neighboring device communicate that information to an emergency service provider or accident response service. The information regarding the emergency situation may include details regarding the vehicle's location, the reason for the emergency, the severity of an accident, details regarding an occupant's health issue, and the like. Additionally, the vehicle requests that the neighboring device provide other details about the emergency situation from the neighboring device's perspective. For example, if the neighboring device includes a camera, the neighboring device may capture images of the emergency situation and communicate those images to an emergency service provider along with the information received from the vehicle. These additional details from the neighboring device's perspective may be helpful for the emergency service provider in analyzing the emergency situation and determining the type of response needed. For example, additional images from the neighboring vehicle may show an extent of damage caused by an accident, which helps the emergency service provider determine what type of response vehicles are needed, such as police, fire, ambulance, and the like.

In some embodiments, the neighboring device captures sounds coming from the vehicle and communicates the captured sounds to an emergency service provider along with the information received from the vehicle. These additional details from the neighboring device's perspective may be helpful for the emergency service provider in analyzing the emergency situation and determining the type of response needed. For example, the captured sounds may indicate whether the vehicle's engine is still running, whether a vehicle occupant is crying for help, or whether the vehicle occupant is speaking particular words or phrases that give instructions or other insight to the emergency service provider. In other examples, the neighboring device may capture other types of data, such as the neighboring device's geographic location (e.g., GPS coordinates), the neighboring device's speed, the neighboring device's direction of travel, a density of neighboring devices, current weather conditions, and the like.

Method 500 continues as the neighboring device receives 516 the information and request from the vehicle and identifies or captures 518 additional details about the vehicle from the neighboring device's perspective. The neighboring device then sends 520 the information received from the vehicle as well as the additional details identified or captured by the neighboring device to an emergency service provider. The emergency service provider can analyze the information and additional details, then determine how to respond to the emergency situation. In some embodiments, a "case ID" is associated with each emergency situation. The case ID is used by the vehicle as well as any neighboring devices. In particular implementations, the case ID is included with communications between the vehicle and the neighboring devices. Additionally, the case ID is included by each neighboring device when sending received information and/or additional details to an emergency service provider or other entity.

Figure 6:
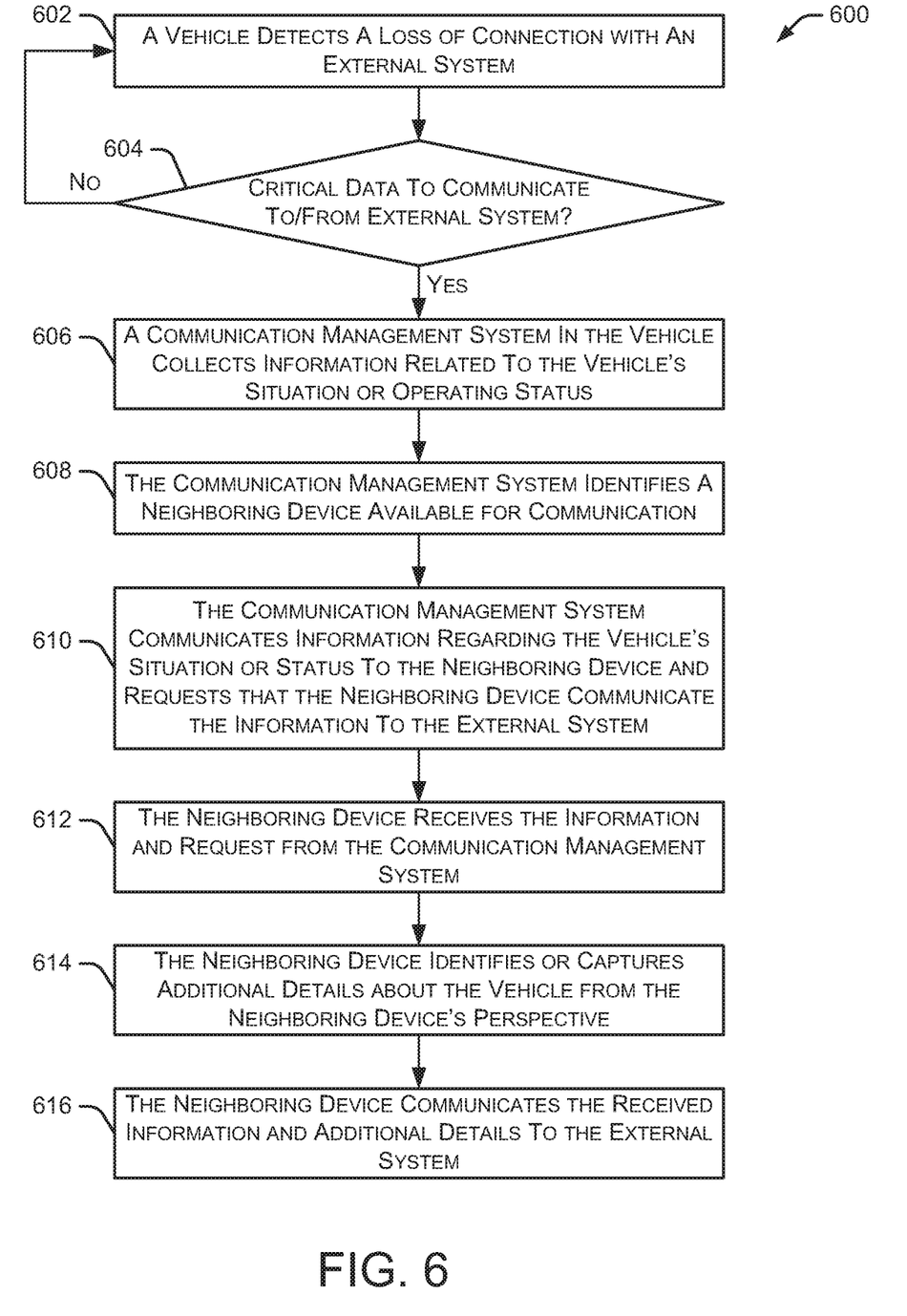
FIG. 6 is a flow diagram illustrating an embodiment of a method for communicating data to an external system.

FIG. 6 is a flow diagram illustrating an embodiment of a method 600 for communicating data to an external system. Initially, a vehicle detects 602 a loss of connection with an external system, such as a server or other device external to the vehicle. For example, the vehicle may experience a loss of connectivity to a data communication network, such as data communication network 404 in FIG. 4. The vehicle then determines, at 604, whether it has critical data to communicate to (or receive from) the external system. If the vehicle does not have critical data to communicate, the vehicle may wait until the connection to the external system is restored. For example, non-critical data may include drive history data or other routine information that is updated to an external server.

However, if the vehicle determines 602 that it has critical data to communicate to (or receive from) the external system, a communication management system in the vehicle collects 606 information related to the vehicle's situation or operating status. For example, the collected information may include critical information that needs to be communicated to the external system such as data related to a vehicle malfunction or data associated with a nearby accident or other emergency situation. Other types of critical information include data that the vehicle needs from the external system to safely navigate an upcoming road or to find a nearest police station, hospital, other emergency service provider. In some embodiments, other types of data include video data, audio data, vehicle status, driving history, diagnostic control signals, estimates of support service availability and arrival time, and the like.

The communication management system then identifies 608 a neighboring device available for communication. Example neighboring devices include one or more of the devices, systems, or vehicles discussed herein with respect to FIG. 4. After identifying 608 a neighboring device, the communication management system communicates 610 information regarding the vehicle's situation or status to the neighboring device and requests that the neighboring device communicate that information to the external system. In some embodiments, the vehicle may also request that the neighboring device provide other details about the vehicle's situation or status from the neighboring device's perspective. For example, if the neighboring device includes a camera, the neighboring device may capture images of the vehicle and communicate those images to the external system. These additional details from the neighboring device's perspective may be helpful when analyzing the vehicle's current situation or status and determining the type of response needed.

Method 600 continues as the neighboring device receives 612 the information and request from the communication management system and identifies or captures 614 additional details about the vehicle from the neighboring device's perspective. The neighboring device then communicates 616 the information received from the vehicle as well as the additional details identified or captured by the neighboring device to the external system. The external system can analyze the information and additional details, then determine how to respond to the vehicle's current situation or status. In some embodiments, the response from the external system includes data or instructions which are received by the neighboring device and communicated from the neighboring device to the vehicle.

As mentioned above with respect to FIG. 5, a "case ID" is associated with each situation that includes, for example, a loss of connection with an external system. The case ID is used by the vehicle as well as any neighboring devices. In particular implementations, the case ID is included with communications between the vehicle and the neighboring devices. Additionally, the case ID is included by each neighboring device when sending received information and/or additional details to an external system or other entity.

In some embodiments, the vehicle communicates with a neighboring device even if the vehicle is able to communicate with an emergency service provider or an external system. For example, in some situations the vehicle wants to communicate the additional information (e.g., images or sounds) from the perspective of the neighboring device to the emergency service provider or external system. Thus, even if the vehicle's modem and other communication systems are operating properly, the vehicle may communicate information regarding the vehicle to the neighboring device with a request that the neighboring device communicate that information as well as additional information from the perspective of the neighboring device to the emergency service provider, external system, or other service.

As mentioned above, a "case ID" may be associated with each accident, emergency situation, or other scenario. The case ID is used by the vehicle that detects an emergency situation (or otherwise needs assistance) as well as any neighboring devices that respond to the vehicle's request for communication and/or additional information. The case ID allows the vehicle and other entities/users to correlate all information and data associated with a particular situation. Using the case ID prevents the situation where an entity/user may detect multiple situations (involving multiple vehicles) based on receiving multiple sets of data and other information from multiple neighboring devices.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
   determining, by a communication management system, whether a vehicle can communicate with an external network;
   responsive to determining that the vehicle cannot communicate with the external network:
   identifying, by the communication management system, a neighboring device that can communicate with the external network;
   communicating vehicle information to the neighboring device; and
   requesting the neighboring device to communicate the vehicle information, and other details from the neighboring device's perspective, to the external network, wherein the other details from the neighboring device's perspective include an image of the vehicle captured by a camera of the neighboring device.

2. The method of claim 1, further comprising communicating, by the communication management system, the vehicle information to the external network responsive to determining that the vehicle can communicate with the external network.

3. The method of claim 1, wherein the external network is associated with an emergency service provider.

4. The method of claim 1, wherein the external network includes a cloud-based server accessible via a data communication network.

5. The method of claim 1, further comprising collecting the vehicle information from at least one vehicle sensor.

6. The method of claim 1, wherein communicating the vehicle information to the neighboring device includes communicating at least one of vehicle situation information, vehicle status information, vehicle location, reason for an emergency, severity of an accident, and occupant health information.

7. The method of claim 1, further comprising receiving data from the neighboring device that was received from the external network.

8. The method of claim 1, wherein the neighboring device includes one of a nearby device, nearby system, or nearby vehicle.

9. The method of claim 1, further comprising associating a case ID with the vehicle information communicated to the neighboring device.

10. A method comprising:
    determining, by a communication management system in a vehicle, whether a vehicle can communicate with an external network
    responsive to determining that the vehicle cannot communicate with the external network, performing:
    identifying, by the communication management system, a neighboring device that is proximate the vehicle;
    communicating, by the communication management system, vehicle information to the neighboring device;
    requesting, by the communication management system, the neighboring device to capture an image of the vehicle by a camera of the neighboring device;
    requesting, by the communication management system, the neighboring device to communicate the vehicle information and the image to the external network.

11. The method of claim 10, wherein the external network is associated with an emergency service provider.

12. The method of claim 10, wherein the external network includes a cloud-based server accessible via a data communication network.

13. An apparatus comprising:
    a vehicle situation manager configured to determine a current situation of a vehicle and configured to determine whether the vehicle can communicate with an external network;
    a processor coupled to the vehicle situation manager and configured to, in response to the vehicle situation manager determining that the vehicle cannot communicate with the external network:
    identify a neighboring device that can communicate with the external network; and
    request the neighboring device to communicate information associated with the current situation of the vehicle and communicate other details from the neighboring device's perspective to the external network, wherein the other details from the neighboring device's perspective include an image of the vehicle captured by a camera of the neighboring device.

14. The apparatus of claim 13, further comprising a communication module in the vehicle configured to communicate with the external network and the neighboring device.

15. The apparatus of claim 13, further comprising:
    a data management module configured to collect the information related to the current situation of the vehicle from at least one vehicle sensor; and a communication module configured to communicate the information related to the current situation of the vehicle to the neighboring device for communication to the external network.

16. The apparatus of claim 15, wherein the information related to the current situation of the vehicle includes at least one of vehicle situation information, vehicle status information, details of an emergency situation, a severity of an accident, and vehicle occupant health information.

17. The apparatus of claim 13, further comprising an occupant vital signs manager configured to identify vital signs associated with at least one occupant of the vehicle.

* * * * *